(12) United States Patent
Kaloudis et al.

(10) Patent No.: US 11,448,594 B1
(45) Date of Patent: Sep. 20, 2022

(54) SYSTEM AND METHOD FOR POST-HARVEST CROP QUALITY AND TRACEABILITY BASED ON NEAR-INFRARED SPECTROSCOPY, ENVIRONMENTAL, AND GAS SENSORS

(71) Applicant: Centaur Analytics, Inc., Ventura, CA (US)

(72) Inventors: Efstathios Kaloudis, Athens (GR); Apostolos Lerios, Austin, TX (US); Sotirios Bantas, Volos (GR)

(73) Assignee: CENTAUR ANALYTICS, INC., Ventura, CA (US)

( * ) Notice: Subject to any disclaimer, the term of this patent is extended or adjusted under 35 U.S.C. 154(b) by 129 days.

(21) Appl. No.: 16/946,218

(22) Filed: Jun. 10, 2020

Related U.S. Application Data

(60) Provisional application No. 62/859,310, filed on Jun. 10, 2019.

(51) Int. Cl.
| | |
|---|---|
| *G01N 21/359* | (2014.01) |
| *G01N 15/14* | (2006.01) |
| *G01N 21/3563* | (2014.01) |
| *G01N 21/55* | (2014.01) |
| *G01N 21/84* | (2006.01) |

(52) U.S. Cl.
CPC ....... *G01N 21/359* (2013.01); *G01N 15/1475* (2013.01); *G01N 21/3563* (2013.01); *G01N 21/55* (2013.01); *B07C 2501/009* (2013.01); *G01N 2021/8466* (2013.01)

(58) Field of Classification Search
CPC ............. G01N 21/359; G01N 15/1475; G01N 21/3563; G01N 21/55; G01N 2021/8466; B07C 2501/009
See application file for complete search history.

(56) References Cited

U.S. PATENT DOCUMENTS

| | | | |
|---|---|---|---|
| 6,646,264 B1 | 11/2003 | Modiano et al. | |
| 2004/0146615 A1* | 7/2004 | McDonald | G01N 21/85 426/231 |
| 2010/0054077 A1* | 3/2010 | Qvarfort | B01F 15/00207 366/142 |
| 2013/0256534 A1* | 10/2013 | Micheels | G01N 21/3577 250/339.07 |
| 2013/0265568 A1* | 10/2013 | Micheels | G01J 3/42 356/51 |
| 2018/0320967 A1 | 11/2018 | Kaloudis et al. | |

OTHER PUBLICATIONS

Al-Mahasneh et al., "Measurement of corn mechanical damage using dielectric properties", Agricultural and Biosystems Engineering Conference Proceedings and Presentations, 2001 ASAE Annual International Meeting (Jul. 30-Aug. 1, 2001), Paper No. 01-1073, 16 pgs.

(Continued)

*Primary Examiner* — Marcus H Taningco
(74) *Attorney, Agent, or Firm* — Ascenda Law Group, PC

(57) ABSTRACT

The present disclosure generally relates to methods and apparatuses that determine quality and authenticity (e.g., adulteration, incorrect labeling, etc.) of agricultural commodities based on near-infrared spectrometers and chemometrics.

5 Claims, 9 Drawing Sheets

(56) References Cited

OTHER PUBLICATIONS

"Moisture Relationships of Plant-based Agricultural Products", American Society of Agricultural and Biological Engineers (2007), ASAE D245.6 Oct. 2007 W/Corr. 1 (R2012), 41 pgs.

Bhargava, et al., "Investigation of Dielectric Properties of Some Varieties of Wheat and their Correlation with Food Nutrients", International Journal of Engineering Science and Innovative Technology (IJESIT), Mar. 2014, vol. 3, Issue 2, ISSN: 2319-5967, 9 pgs.

Clemen, R.T., "Combining forecasts: A review of annotated bibliography," International Journal of Forecasting (1989), 5:559-583.

EUR-Lex: Regulation (EC) No. 178/2002 of the European Parliament and of the Council of Jan. 28, 2002 laying down the general principles and requirements of food law, establishing the European Food Safety Authority and laying down procedures in matters of food safety, 24 paes.

Flinn et al., "Evaluation of various near infrared spectrometers for estimating grain quality for livestock", The University of Sydney, Applications (2005), pp. 330-333.

Levasseur-Garcia C., "Updated Overview of Infrared Spectroscopy Methods for Detecting Mycotoxins on Cereals (Corn, Wheat, and Barley)", Toxins (2018), 10(1):38.

Manley, et al., "Spectroscopic Technique: Near Infrared (NIR) Spectroscopy, Modern Techniques for Food Authentication", Modern Techniques for Food Authentication (Second Edition), Chapter 3 (2018), 52 pgs.

Martínez-Nicolás, Juan J., "Using Near-Infrared Spectroscopy in Agricultural Systems", INTECH (2017), http://dx.doi.org/10.5772/67236, Chapter 5, pp. 97-127.

Nelson, Sturart O., "Dielectric Properties of Agricultural Materials and their Applications", Grain and Seed Moisture Sensing Applications (2015), Chapter 7, 292 pgs.

Nicolaï et al., "Nondestructive measurement of fruit and vegetable quality by means of NIR spectroscopy: A review", Postharvest Biology and Technology (2007), 46:99-118.

Osborne, Brian G., "Near-Infrared Spectroscopy in Food Analysis", Encyclopedia of Analytical Chemistry (2006), 14 pgs.

Pojic, et al., "The Application of Near Infrared Spectroscopy in Wheat Quality Control", Infrared Spectroscopy—Life and Biomedical Sciences (2012), 19 pgs.

Roberts; et al., "Near-Infrared Spectroscopy in Agriculture", American Society of Agronomy, Inc. (2004), Madison, Wisconsin, USA, No. 44 in the series Agronomy, 22 pgs.

Schreyer; et al.,"Determination of moisture in a protein sample using a portable NIR instrument", Thermo Scientific (2014), 3 pgs.

Sørensen, et al., "The use of rapid spectroscopic screening methods to detect adulteration of food raw materials and ingredients", Curr. Opin. Food Sci. (2016), 10:45-51.

Thakur et al., "Framework for implementing traceability system in the bulk grain supply chain", Journal of Food Engineering (2009), 95(4):617-626.

Thermo Scientific TruScan RM and microPhazir RX, Achieve quality initiatives throughout the manufacturing process, Thermo Scientific (2013), 5 pgs.

\* cited by examiner

SYSTEM AND METHOD FOR POST-HARVEST CROP QUALITY AND TRACEABILITY BASED ON NEAR-INFRARED SPECTROSCOPY, ENVIRONMENTAL, AND GAS SENSORS

CROSS-REFERENCE TO RELATED APPLICATIONS

This application claims priority to U.S. Provisional Patent Application No. 62/859,310, filed on Jun. 10, 2019, the contents of which are incorporated by reference in its entirety.

FIELD

The present disclosure relates to near-infrared (NIR) spectroscopy for agricultural commodities; particularly, NIR spectrometers, data analytics, chemometrics, food quality, and logistics management.

BACKGROUND

Jones et al., U.S. Pat. No. 8,031,910 describes a method and apparatus for measuring and selecting grain used for milling or breeding by optically analyzing seeds/grains to qualitatively and quantitatively and characterize them. The analysis includes a color image analysis to characterize multiple quality traits.

Modiano et al., U.S. Pat. No. 6,646,264 describes methods and apparatus to analyze agricultural products by non-destructive processes, including analysis of transmissive and reflected light.

Mayes, U.S. Pat. No. 6,100,526 describes an NIR analyzer for determining percentage concentrations of constituents in a sample of grain or other agricultural product. The analyzer irradiates the sample, receives reflected wavelengths therefrom, and from the intensity of reflected light at discrete wavelengths determines constituents of the sample therefrom.

Webster, U.S. Pat. No. 4,260,262 describes a grain quality analyzer for determining percentage concentrations of various constituents in a grain sample through photo-optical measurements of the sample.

BRIEF SUMMARY

Embodiments of the present invention provide solutions that determine quality and authenticity (e.g., adulteration, incorrect labeling, etc.) of agricultural commodities based on NIR spectrometers and chemometrics. Example methods are disclosed herein, including: a method for classifying the properties of a sample of a commodity, the method comprising: situating one or more devices at a position within the commodity sample, wherein the device comprises a spectrometer, and, optionally, one or more sensors for determining one or more environmental parameters; obtaining one or more near-field infrared spectra of the commodity surrounding the position by the spectrometer, and, optionally, environmental sensor data from the one or more sensors; preprocessing the obtained spectra to remove intensity variation due to irrelevant factors; and computing a prediction regarding the properties of the commodity sample using a model correlating infrared spectra and commodity properties, wherein the prediction is based on one or more obtained spectra, and, optionally, environmental sensor data from the one or more sensors. In certain embodiments, the environmental sensor data includes measurements selected from the list consisting of: relative humidity, temperature, grain dielectric properties, concentrations of certain gasses present in the environment of the commodity, commodity acidity, and alkalinity. In certain embodiments, the prediction concerns one or more of: surface mold, mycotoxins, adulteration of the commodity sample, authenticity of the commodity sample, or grading of the commodity sample.

BRIEF DESCRIPTION OF THE FIGURES

The various described embodiments are illustrated by way of example, and not limitation, in the figures of the accompanying drawings, in which.

DESCRIPTION

1. Introduction

Near-infrared (NIR) radiation covers the range of the electromagnetic spectrum between 780 nm and 2500 nm. In NIR spectroscopy, a substance such as an agricultural product is irradiated with NIR radiation, and the reflected or transmitted radiation is measured. As the radiation penetrates the product, its spectrum (namely, the radiation intensity at each wavelength) changes due to wavelength-dependent scattering and absorption processes. This change depends on the chemical properties of the product, such as its chemical composition (e.g., C—H, O—H and N—H chemical bonds) and its microstructure which influences light scattering; it also depends, indirectly, on environmental factors or parameters (temperature, relative humidity, the presence of other gases, etc.) because those influence the chemical properties of the product, the transmission/reflection of radiation through surrounding air, or both. Advanced multivariate statistical techniques (chemometrics) are then applied to deduce the product's chemical properties from the usually convoluted spectra and, if available, from the measurements of environmental parameters [Nikolai et al., 2007] [Osborne, 2006].

An alternative method to deduce chemical properties is wet chemical analysis, which consists of preparing the product (usually grounding it up into a powder), then combining it with known chemicals (usually liquids, hence "wet"), and finally measuring the results of various chemical reactions. Compared to wet chemical analysis, NIR spectroscopy has numerous advantages such as [Pojic, 2012]:

a. Significant reduction of testing time.
 b. No requirement for the use of chemicals and their preparation.
 c. No requirement for manual sample preparation.
 d. No requirement for significant technical expertise to carry out the examination.
 e. No health risk from harmful chemicals, either applied or generated during the analysis.

It should be underscored that the present invention is not limited to only environmental parameters in its methodology though the term is used for simplicity of exposition in the majority of this description. Environmental parameters are exterior to the product. However, direct or indirect measurements of certain product properties may also be incorporated into the methodology in the same fashion as environmental parameters. We discuss examples of such measurements below.

2. Device

A portable, handheld device 102 containing a spectrometer and, optionally, other sensors (e.g., gas, temperature, and/or relative humidity sensors) may be used to directly acquire spectra and environmental parameters in situ.

Figure 1:
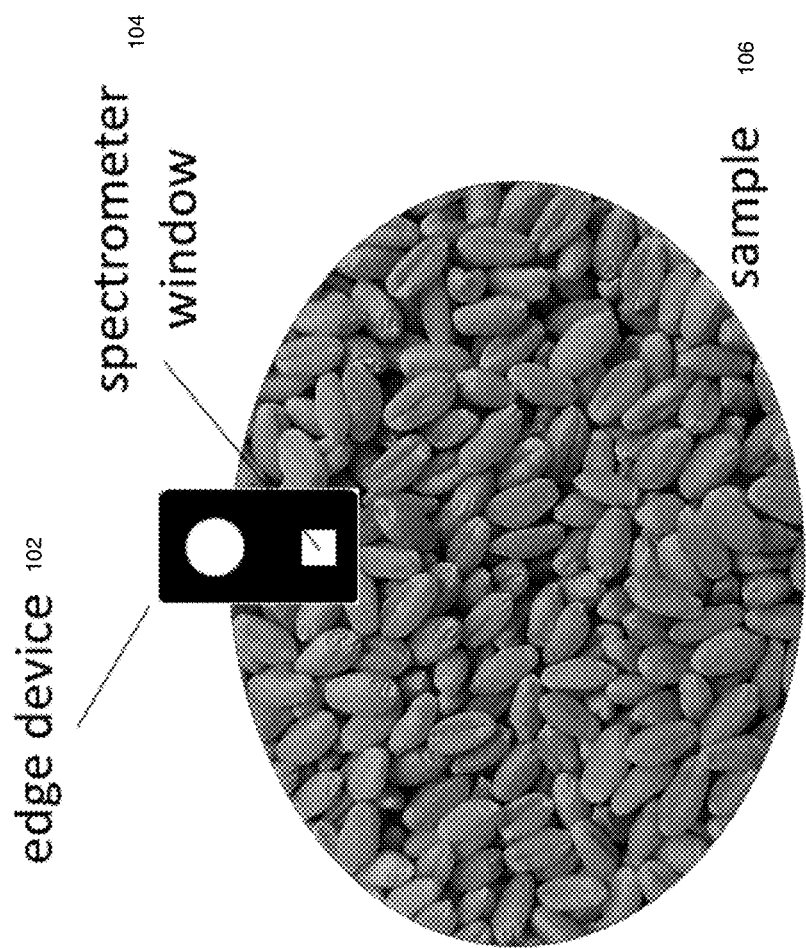
FIG. 1 illustrates an example of data acquisition using an edge device configured in accordance with embodiments of the present invention in which the edge device is fully or partially submerged within an agricultural commodity such as a grain sample so that a spectrometer window of the edge device is fully covered by the sample constituents.

FIG. 1 illustrates an exemplary method of data acquisition using such a device. The portable device 102 is submerged, fully or partially, within the agricultural commodity 106. A prerequisite is that the "window" (or "eye") of the spectrometer 104 is covered by the commodity 106 under examination. The acquisition process could be initiated manually by a user or automatically from a cloud service. One should note that there is no manual product sample preparation step in the method.

Figure 2:
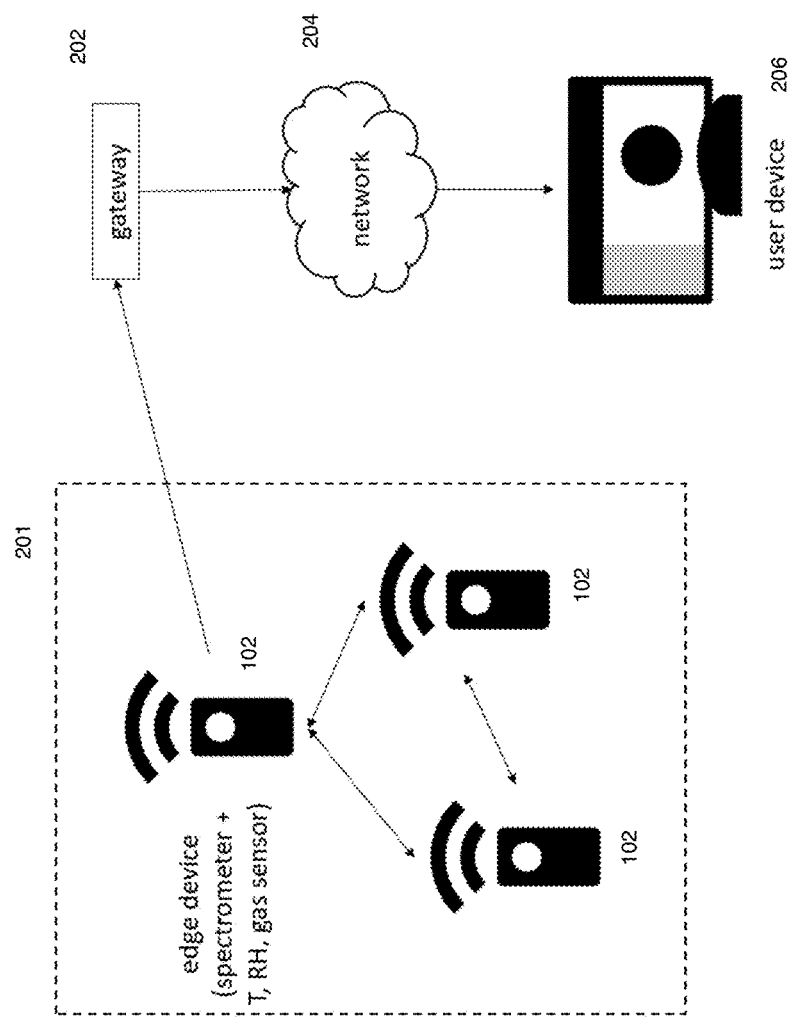
FIG. 2 illustrates a collection of edge devices such as that shown in FIG. 1 arranged for acquiring sensor data by measuring physical features of a sample and configured to wirelessly transmit the collected data to a collection/analysis point via a network.

FIG. 2 shows how the data acquired by the spectrometer and other sensors, all embedded in an edge device 102, is transferred to the user as well as how the device is controlled [Bantas et al., 2018]. The edge device 102 wirelessly transmits data, including the acquired measurements and timestamps, to an external network 204 (such as the internet) via a gateway device 202; in the event more than one device is used and all are situated near each other (e.g., within a container 201 for an agricultural commodity 106), the devices form a wireless ad hoc network via which data is transmitted between them and eventually, by one of them, to the gateway. Afterwards, the data is transferred to a cloud platform within the external network, and ultimately to a user device 206. The user device 206 may be a laptop or desktop computer, a mobile device such as a smart phone, or a wearable device such as a smart watch. The flow of information may be reversed for control purposes, with control signals flowing from the user device or cloud platform to the edge devices.

Transferring NIR spectra automatically to the cloud offers multiple advantages over a more traditional approach wherein spectra are locally processed within the spectrometer or a proximal computing device, typically operated by a human operator:

The computing resources (computational power, storage capability, etc.) of cloud computing are several orders of magnitude higher than those of a handheld or portable device. This enables the application of more complex data analysis algorithms and/or the quicker delivery of analysis results.

The computing requirements of the portable spectrometer and its proximal computing device can be limited to elementary signal processing and networking operations, resulting in savings during manufacture, operation, and maintenance, such as lower-cost components, reduced battery usage, and higher reliability.

Access to cloud resources can be better secured, providing additional reassurance against tampering (see Section 4.6).

Data collection from one geographic location could be used instantly to analyze data from another geographic location, a feature applicable in the transport of goods (see below) as well as enabling dynamic and iterative improvements on a predictive model used in one location using data obtained in another location where a similar product is being analyzed (see below).

Avoiding human interaction for data capture and recording, and performing these functions in an automated manner, ensures the objectivity of record.

3. Methodology

The present invention is centered on a predictive model wherein, given NIR spectra (and, optionally, the environmental parameters under which the spectra is obtained) for a product (or any substance), its chemical properties are deduced (predicted). In addition, if the model also contains a library of known products, each with a distinguishing set of chemical properties, the substance may be compared against this library, thereby making a statistically valid prediction of its identity (if it is a known product), a determination that it is absent from the library (i.e., it is an unknown product), or that it is a mix of known and unknown products (e.g., a blend of multiple coffee bean varieties, some known, some unknown). Note that "product identification" in this context may mean determining the type of agricultural product (rice vs. coffee), a specific variety of product (rice produced in the US vs. in South America, or a blend), the occurrence of product spoilage (healthy rice vs. decomposing rice), and other applications discussed in Section 4.

Figure 3:
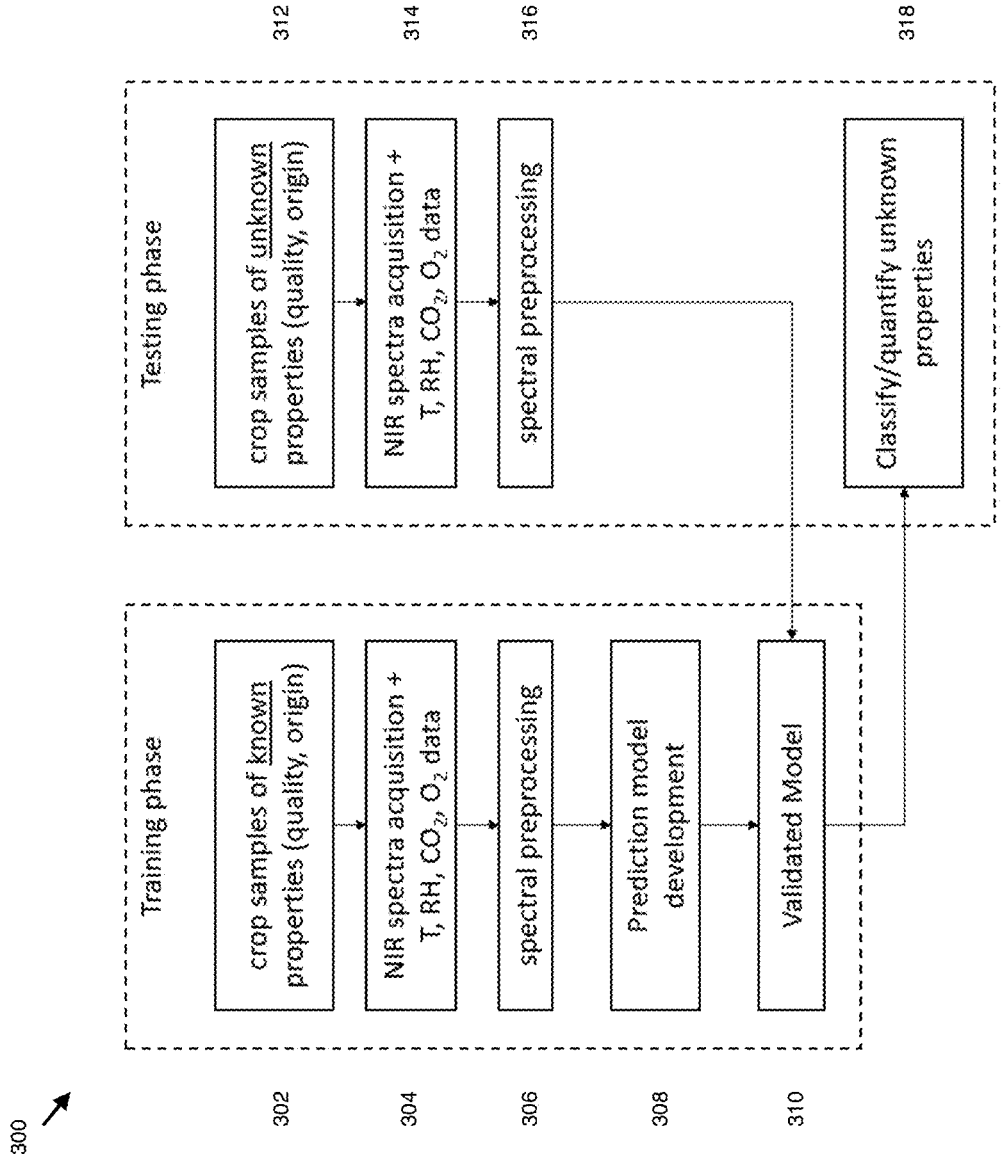
FIG. 3 illustrates an example of a method for creating a predictive model wherein, given NIR spectra for a product (e.g., a crop sample) and, optionally, environmental parameters under which the spectra are obtained, its chemical properties are deduced (predicted)

The methodology for creating and applying (using) a predictive model is presented in the following sections and in FIG. 3. Variations of these methods are possible; hence, they are intended to be illustrative rather than exhaustive. For example, the methodology may be altered to create descriptive models, which are generally simpler than predictive ones. One such exemplary method 300 is depicted in FIG. 3, comprising a training phase for creating a model using crop/commodity samples having known properties (steps 302-310), and a testing phase for using the validated model created by the training phase to classify or quantify the unknown properties of crop/commodity samples with unknown properties (steps 312-318).

In addition, the steps of the methodology are presented in linear order, from model creation to model application (use), primarily for the benefit of simplifying this exposition; in practice we continue to augment the model during its application by using products we encounter after the model is created to further revise, validate, and improve the model. For example, under the user's guidance and labeling assistance the model's library is augmented (new products are added) and/or identification errors are corrected. Someone skilled in the art can easily translate our linear methodology as described herein into an iterative one.

3.1 Preparation for Spectral Data Acquisition (302)

As is typical in model creation, we start by obtaining the spectra of a wide range of known, pre-identified products (thus labeled using a commercially available reference method outside the scope of this invention), such as a variety of rice grains, each variety cultivated under different conditions and thereby having unique chemical properties. Moreover, we do so under a variety of environmental conditions. In an ideal setting, in this step we would encounter every possible product and measure its spectra under all possible environmental conditions. That is impractical, however; instead, we sample a statistically adequate subset of this vast range of input parameters by examining products we are likely to encounter when we eventually apply the completed model, and under a practical target range of real-world environmental conditions. In addition, we create a model that is capable of limited extrapolation, i.e., able to identify unknown products as being similar (not identical) to known ones.

Figure 4:
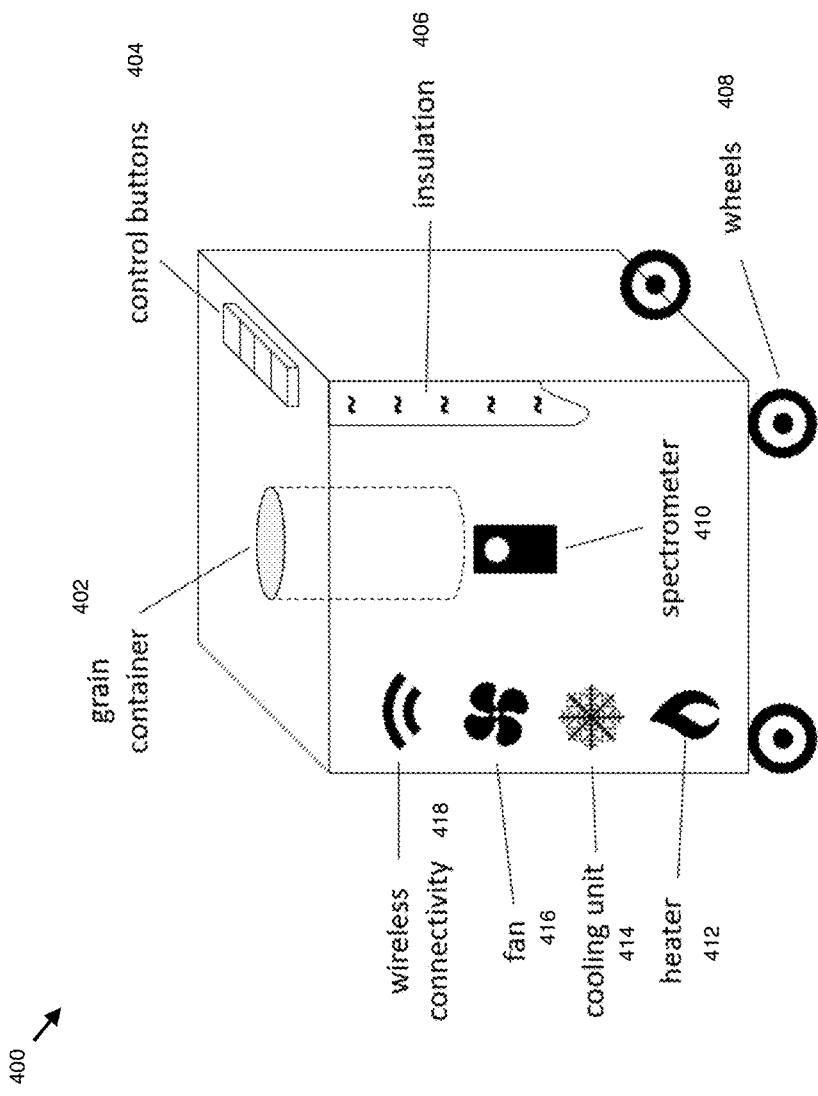
FIG. 4 an example of a chamber for automated grain sample preparation in accordance with some embodiments of the present invention.

To acquire such reference samples of an adequate parameter range, three classes of methods are contemplated:

a. A lightweight and portable chamber 400 (see, e.g., FIG. 4) may be shipped to the user; that chamber 400 is able to perform its sample acquisition tasks automatically and with little user involvement. The chamber is equipped with climate control devices (e.g., heater 412, ice box, air conditioning unit 414, fans 416) and ancillary environmental sensors to measure the controlled climate and may be rolled to various locations using wheels 408. Furthermore, the chamber could have thermal insulation 406 and it could be cloud-connected, via, e.g., wireless networking elements 418 for better control of the procedure (e.g., custom user settings, troubleshooting). The user pours the grain in a container 402 and with a simple interface 404 (e.g., pressing a start button) initiates the acquisition process. The chamber than alters the environment within the container while the sensors (not shown) measure the environmental parameters until they have stabilized at a sampling point within the target ranges; the enclosed spectrometer 410 then automatically (see Section 3.2) acquires spectral data that is associated with those parameters. The chamber continues to alter the container environment and the spectrometer continues to acquire spectral data until the full target range of parameters is covered at a sampling density adequate to create a statistically valid predictive model.

b. The spectrometer and ancillary sensors are placed within a grain container, and within the grain stored therein, in such a manner that, through other means such as locks and over an extended period of time (e.g., several days or weeks), the container is guaranteed to contain only the grain that needs to be sampled. The spectrometer and ancillary sensors collect spectra and parameter measurements over time as external weather conditions cause the environment within the container to change. While the target parameter ranges may not be fully covered using this method, this method nevertheless covers a subset of those ranges that most frequently occurs in practice.

c. In the first method above, the climate in which the NIR samples are acquired is fully controlled via instrumentation; in the second method, it is not controlled at all, but instead it is being passively measured. A third method is a mix of the two wherein, as in the second method, the equipment (spectrometer and ancillary sensors) are placed within grain in a container, but as in the first method, some climate control devices (such as a small heater) are attached to the equipment so that it may actively increase the grain temperature in its vicinity.

In the testing phase, a device 102 having a spectrometer may be positioned in any container or other volume of crop sample in preparation for obtaining infrared spectra and subsequent classification of the characteristics or properties of the crop sample (312).

3.2 Spectral Data Acquisition (304, 314)

Figure 5:
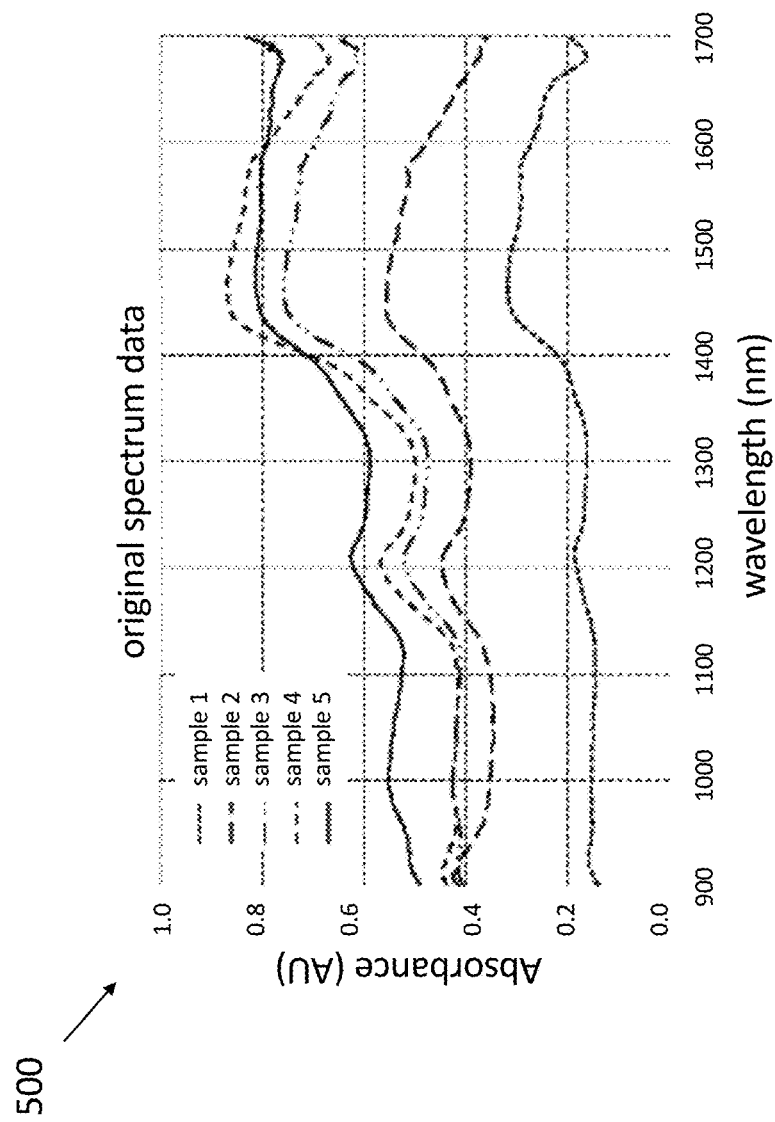
FIG. 5 illustrates an example of NIR spectra from a group of samples before any preprocessing.

Regardless of the mechanism causing environmental parameters to vary—be it active, passive, or a mix of the two, the infrared spectra of the reference samples are acquired either by reflection or transmission-mode spectroscopy (see, e.g., the exemplary original sample spectra 500 in FIG. 5). In reflection mode, the spectrometer measures the intensity of the light reflected by the product, whereas in transmission mode, the spectrometer measures the intensity of light transmitted through the product [Levasseur-Garcia, 2018].

Figure 6:
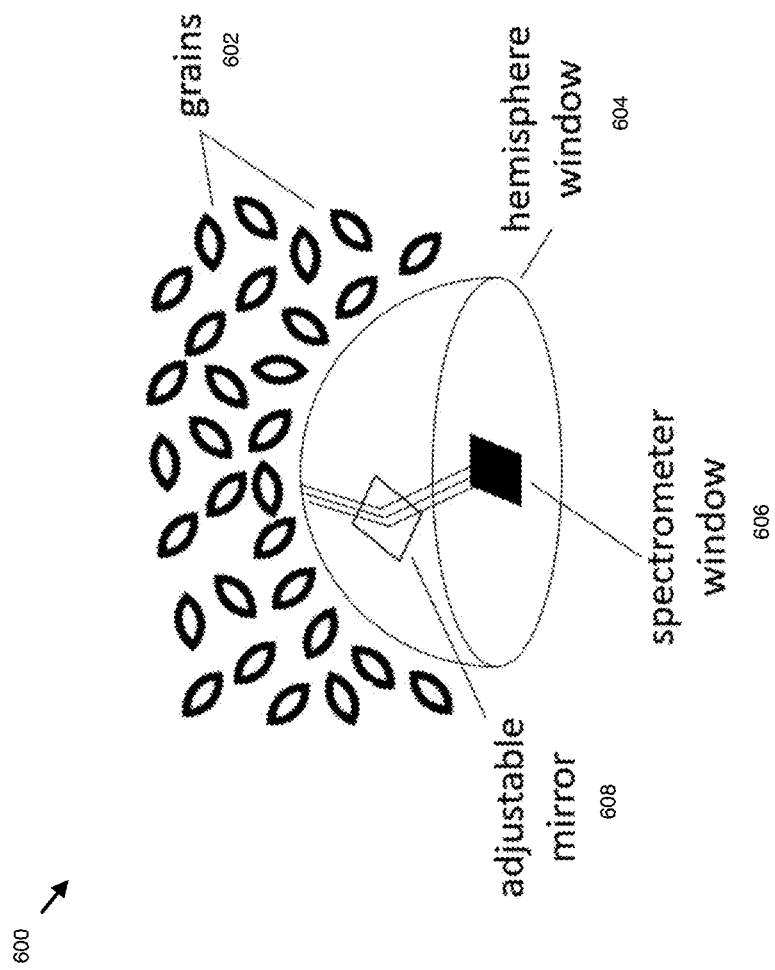
FIG. 6 illustrates how a hemisphere window enables a spectrometer to adjust its focal length and collect spectra from multiple grain positions in accordance with some embodiments of the present invention.

For grain product, our methodology doesn't require the grain to be ground which is easier for the user but leaves the product in a form that has no physical uniformity. This lack of uniformity manifests in NIR spectra that are influenced by the grain orientation and density, factors which are not related to the grain's chemical properties. For that reason, we measure as many positions and combinations of grain facing the spectrometer window as practically possible (for each configuration of environmental parameters). This process is time-consuming and would normally require human labor. The present invention tackles this issue with the addition of vibration and/or stirring accessories that change the position of the grains that face the spectrometer window. Additionally or alternatively, the spectrometer window 606, e.g., of spectrometer 410 or edge device 102, is placed at the center of a transparent, hemi-spherical container 604 (see FIG. 6, showing exemplary configuration 600) allowing a clear view of multiple placements of the grain 602 (namely, all points on the surface of the hemisphere); adjustable mirrors 608 and lenses are used to retrieve individual spectral samples, each one obtained using an appropriate adjustment to viewing angle and focus.

3.3 Preprocessing of Spectral Data (306, 316)

Figure 7:
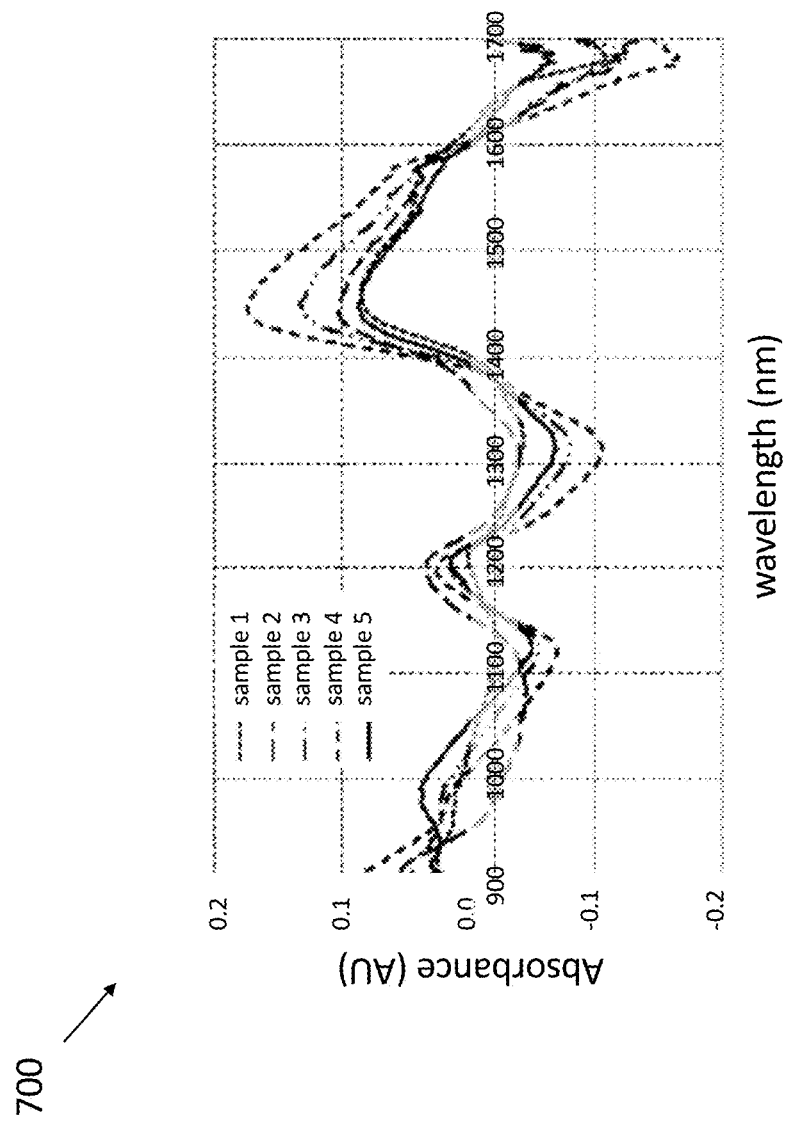
FIG. 7 illustrates an example of NIR spectra from a group of samples after preprocessing.

The raw spectral data thus obtained include intensity variations related to factors that should not be considered in the model, such as the orientation and density discussed in Section 3.2. To reduce or suppress those variations, the present invention preprocesses all spectra, usually in groups, one such exemplary group being all spectra obtained during a scan of the surface of the hemi-spherical container. FIG. 7 shows preprocessed spectra 700.

Several preprocessing methods are commonly used in infrared spectroscopy: derivative, smoothing, detrending, multiplicative scatter correction, and others [Levasseur-Garcia, 2018], [Manley, 2018]. The right choice of method may be critical to the creation of the model, and may depend on the application of the model; as such, we list our method of choice in Section 4, alongside each application.

3.4 Model Creation (308)

A model is then created to establish a correlation between the measured spectra (and environmental parameters), and the a priori known chemical properties (or identities) of the reference samples. The environmental parameters are incorporated in the model as additional numeric inputs, much as if they had been measurements of NIR radiation intensity at some additional wavelengths but without the preprocessing step of Section 3.3; hence, without loss of generality, the methods discussed next refer only to measured spectra.

The two main chemometric model creation methods used in NIR spectroscopy are classification and regression [Levasseur-Garcia, 2018], summarized below:
a. Classification methods classify the samples into groups, called classes, based on their distinguishing spectral features. Classification methods may be supervised or unsupervised. In unsupervised classification, the spectral similarities and dissimilarities of the samples are used to create groups, whereas in supervised classification, group membership is defined at the beginning of the modeling (discriminant analysis). Unsupervised methods, such as principal component analysis (PCA) and hierarchical cluster analysis, are often deployed as investigative tools in the early stages of data analysis to give indications of possible relationships between samples. Supervised methods include, among others, k-nearest neighbors, artificial neural networks, and support vector machines [Manley, 2018].
b. Regression methods are used to link spectra to chemical values and include linear and nonlinear methods. Some of the linear-regression methods are multiple linear regression, principal component regression, and partial least squares regression, whereas one of the most common non-linear methods is artificial neural networks.

3.5 Model Validation (310)

It is important to assess the prediction accuracy and precision of the model on a set of sample products before using the model in real-world applications. This is done via validation or prediction testing, which refers to computing the difference between NIR spectroscopy prediction results obtained for the constituents, properties or identification or classification, and their corresponding a priori known counterparts (obtained via the aforementioned reference method). Validation is best done using a set of samples that are representatives of real-world situations the model is likely to encounter during future application. The reference samples fit that description, but using the same samples to create the model as well as to assess it leads to bias. As a result, rather than use all the reference samples for model creation, we split the samples into two groups: a subset used for model creation per the sections above, and a validation subset [Levasseur-Garcia, 2018].

This split of the reference samples into the two subsets can be done once, permanently excluding the validation subset samples from use in model creation, and instead reserving them for the exclusive use of validation; in that case, the validation subset is chosen randomly or by hand-picking a representative subset of the reference samples. The model may be repeatedly re-created by altering its creation process, but every resulting model is always validated against the one and only validation subset. This method is called independent or external validation.

Alternatively, the reference samples may be split into the two subsets again and again, each time choosing a different subset for validation. For each split, or round, the model is re-created de novo and validated. This method is called cross-validation and its variants employed by the present invention are:
a. In full cross-validation, there are as many rounds as samples and, in each round, the validation set consists of a single sample, taking each reference sample in turn. A laborious extension of this method considers every possible pair, or triplet, and so on of samples as a validation set, resulting in a large number of rounds; nevertheless, the computational resources of cloud computing permit such exhaustive validation.
b. In partial cross-validation, each round's validation set consists of a fixed-size group of samples. This group may be selected as follows:
  i. Randomly for each round among all samples, in which case a single sample may participate in the validation set of none, one, or many rounds.
  ii. Alternatively, before validation begins, the original sample set may be divided once into fixed-sized groups (with random selection of the group members); then, during validation, each of these groups takes exactly one turn being the validation set.

The metrics used to compute the difference between model predictions and their corresponding a priori known counterparts are standard statistical measures employed in NIR analysis. These include the standard error of prediction (SEP) or standard error of cross-validation (SECV), bias, coefficient of determination (R2), and the ratio of standard error of performance to standard deviation (RPD) [Manley, 2018].

The validated model may be used to classify/quantify the unknown properties of testing phase crop samples (318).

3.6 Prediction Aggregation

The combination of predictions is a common practice to increase the accuracy of forecasts, and has been well-studied [Clemen, 1989]. For the purposes of the present invention, we assume that all N predictions, each assigning a probability $p_i$ to an outcome, have equal weight of 1/N, meaning that no prediction is a priori superior to any other. In order to forecast a single probability for the outcome, we combine all $p_i$ values. For example, the N predictions may be associated with the N different spectra we acquired for a yet-unknown product, and $p_i$ is the probability computed by the model using spectrum i that the unknown product is a match to a specific known product. The single forecast is the overall probability, across all N spectra, that the unknown product is the specific known product.

Common approaches to compute the overall probability include the arithmetic mean A (or plain average) and geometric mean G of the probabilities:

$$A = (p_1 + p_2 + \ldots + p_N)/N$$

$$G = (p_1 p_2 \ldots p_N)^{(1/N)}$$

More complex methods are also used; for example, externally Bayesian pooling computes the overall probability as:

$$G/(G + G_c)$$

where $G_c = (1-p_1)(1-p_2) \ldots (1-p_N)^{(1/N)}$ is the geometric mean of the complement (mismatch) probabilities, namely $(1-p_i)$.

3.7 Improved Model Accuracy Using Additional Sensors

To augment the accuracy of the model, the present invention can incorporate measurements of environmental parameters, as well as product properties. These parameters can be measured during initial model creation, or during model application, during which the model is iteratively improved. Environmental parameters can be measured directly, using sensors, or may be derived from such measurements using pre-existing, well-known models independent from the present invention (see FIG. 8). The choice of environmental parameters may depend on the application of the present invention as certain parameters are known a priori to have a strong correlation with the specific traits of the product's chemical composition that we wish to identify; see Section 4. Exemplary parameters are discussed in the subsections below.

3.7.1 Direct Sensor Data

Figure 8:
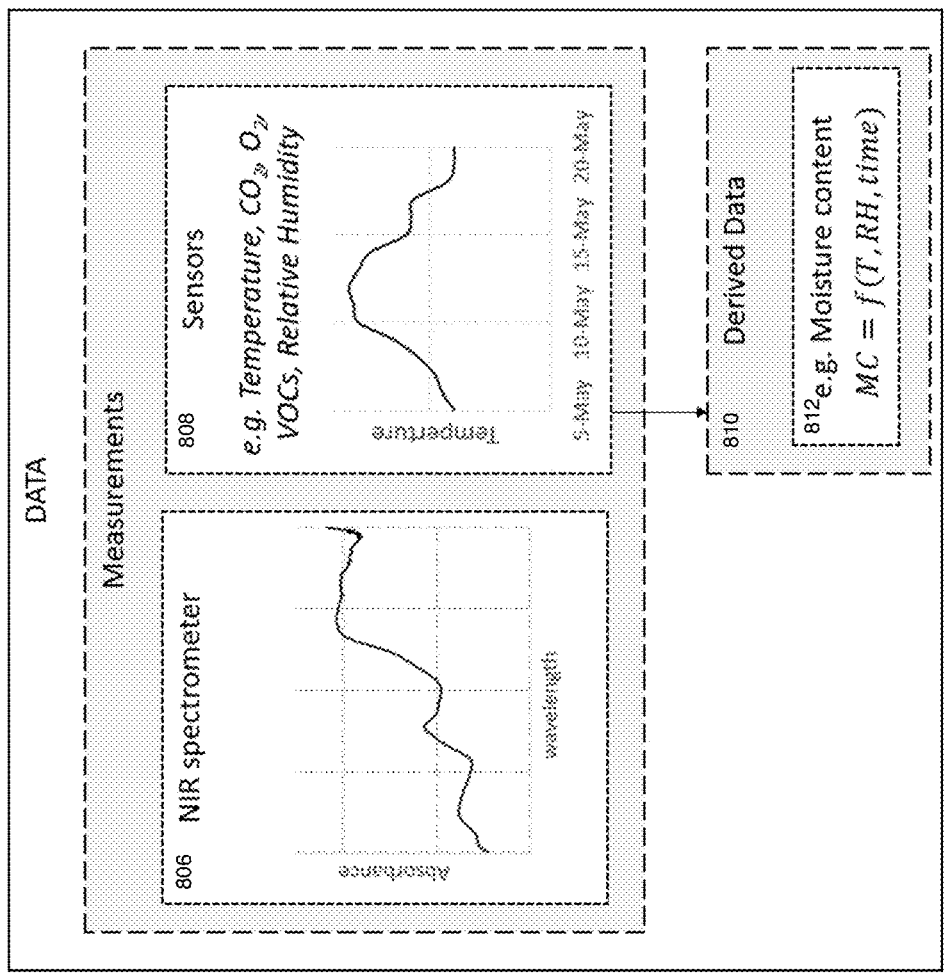
FIG. 8 illustrates how model creation relies on directly measured spectra as well as environmental parameters in accordance with some embodiments of the present invention.

Sensors are commercially available to directly measure physical characteristics of the commodity and/or its environment, such as temperature, relative humidity, concentrations of gasses such as $CO_2$, $O_2$, and volatile organic compounds (VOCs) concentrations, pH, etc. These measurements often help with spoilage detection. FIG. 8 illustrates how model creation can rely on directly measured spectra 806 as well as environmental parameters 808.

3.7.2 Grain Moisture Content (MC)

There are several derived grain properties 810 that can be indirectly derived from, e.g., the direct sensor measurements 808 of Section 3.7.1, such as the derived grain moisture content 812, which is a critical property for agricultural commodities (FIG. 8). If relative humidity and temperature are measured, there are several well-established empirical equations found in the literature giving the value of MC, such as the Modified Henderson Equation [ASAE, 2012]:

$$MC = \left[ \frac{\ln(1-RH)}{-K(T+C)} \right]^{1/N}$$

Where MC is the grain moisture content (%), RH is the relative humidity (decimal) and T is the temperature (° C.). Values of K, N, and C depend on the commodity. Table 1 provides such values for common commodities.

TABLE 1

| Grain Type | K | N | C |
|---|---|---|---|
| Corn, yellow dent | $8.6541 \times 10^{-5}$ | 1.8634 | 49.810 |
| Soybean | $30.5327 \times 10^{-5}$ | 1.2164 | 134.136 |
| Wheat, durum | $2.5738 \times 10^{-5}$ | 2.2110 | 70.318 |

3.7.3 Grain dielectric properties.

The dielectric properties, or permittivities, of cereal grains and oilseeds vary with the frequency of the applied electric field, the moisture content of these products, their temperature, and bulk density. Grain and seed permittivities have, therefore, been useful for the rapid measurement of moisture content [Nelson, 2015]. Also, some studies correlate grain dielectric properties with food nutrients (carbohydrates, protein, fat) [Bhargava, 2014] and with kernel mechanical damage [Al-Mahasneh, 2001]. For the present invention, grain dielectric properties could be used to further increase the accuracy of the model.

4. Applications

4.1 Grain Quality

4.1.1. Surface Molds

Spoilage of grain comes about when microorganisms (e.g., bacteria, microbes, yeast, fungi, molds) consume the nutrients present in the grain for their own growth and reproductive processes, resulting in grain nutrient loss. Also, microorganisms produce heat and moisture during growth which can cause a temperature rise in stored grain; such heating may cause "heat damage," may sometimes render grain unfit for feed, and even cause fires and dust explosions in storage structures [Kaleta, 2013].

Example of Surface Mold Detection:

| Commodity | Maize |
|---|---|
| Reference samples | Uncontaminated samples, and samples contaminated by surface molds |
| Reference method | The number of viable fungal cells per unit area (CFUs) |
| Number of NIR spectra | 500 spectra for each sample |
| Preprocessing method | Second derivative |
| Model creation | Support vector machines classification |
| Model validation | Cross-validation |
| Model prediction | Detection of surface mold on the test sample |

4.1.2 Mycotoxins

The presence of mycotoxins in grain commodities has significant impact not only to public health, but also on agriculture economics and technology by reducing the yield, as well as nutritional and overall grain quality.

Example of Mycotoxin Detection:

| Commodity | Wheat |
|---|---|
| Reference samples | Uninfected and artificially inoculated wheat heads in a wide range of mycotoxin (e.g., DON) concentrations |
| Reference method | High Performance Liquid Chromatography |
| Number of NIR spectra | 40 spectra for each sample (300 total) |
| Preprocessing method | Second derivative |
| Model creation | Partial least squares regression |
| Model validation | Cross-validation |
| Model prediction | Presence and concentration of mycotoxins in the test sample |

4.2 Adulteration

In this context, adulteration is the undeclared introduction of additional substances to foods, food raw materials, and ingredients with the aim of artificially augmenting the apparent quantity of the food item [Sorensen, 2016].

Example of Adulteration:

| Commodity | Coffee beans |
|---|---|
| Reference samples | 10 samples of Arabica and Robusta green beans of different geographic origins |
| Reference method | N/A |
| Number of NIR spectra | 300 spectra for each sample (3000 total) |
| Preprocessing method | Baseline iterative restricted least squares correction |
| Model creation | PCA |
| Model validation | Cross-validation |
| Model prediction | Variety of the test sample |

4.3 Authenticity

Authenticity refers to the truthfulness of the quality of foods, food raw materials, and ingredients including the origin, variety, provenance, original production recipes, producers, applied methods, geographical location, and time [Ssrensen, 2016].

Example of Origin Detection:

| Commodity | Rice |
|---|---|
| Reference samples | Five samples of the same variety from known geographic origins |
| Reference method | N/A |
| Number of NIR spectra | 500 spectra for each sample (2500 total) |
| Preprocessing method | Standard normal variate |
| Model creation | Back propagation artificial neural networks |

| | |
|---|---|
| Commodity | Rice |
| Model validation | External validation (100 non-used rice samples) |
| Model prediction | Geographic origin of the test sample |

4.4 Food Fraud

In this context, food fraud is the intentional misrepresentation of foods, food raw materials, and ingredients, typically with the aim of artificially augmenting the market appeal of the food item. This includes the use of prohibited substances, contamination of the product, and other non-compliances to product descriptions [Ssrensen, 2016]. The present invention can be used to identify instances of food fraud as NIR spectra is typically altered when the product is thus modified.

4.5 Grain Grading.

Certain commodities are graded in terms of their quality, and their grade influences their market price. This grading is based on the chemical and structural properties of the commodity, as well as its purity. For example, grain is graded on its protein content, presence of damaged kernels, and presence of foreign material such as soil. The present invention can be used to grade commodities as the aforementioned factors influence NIR spectra.

4.6 Traceability Across the Food Chain.

Figure 9:
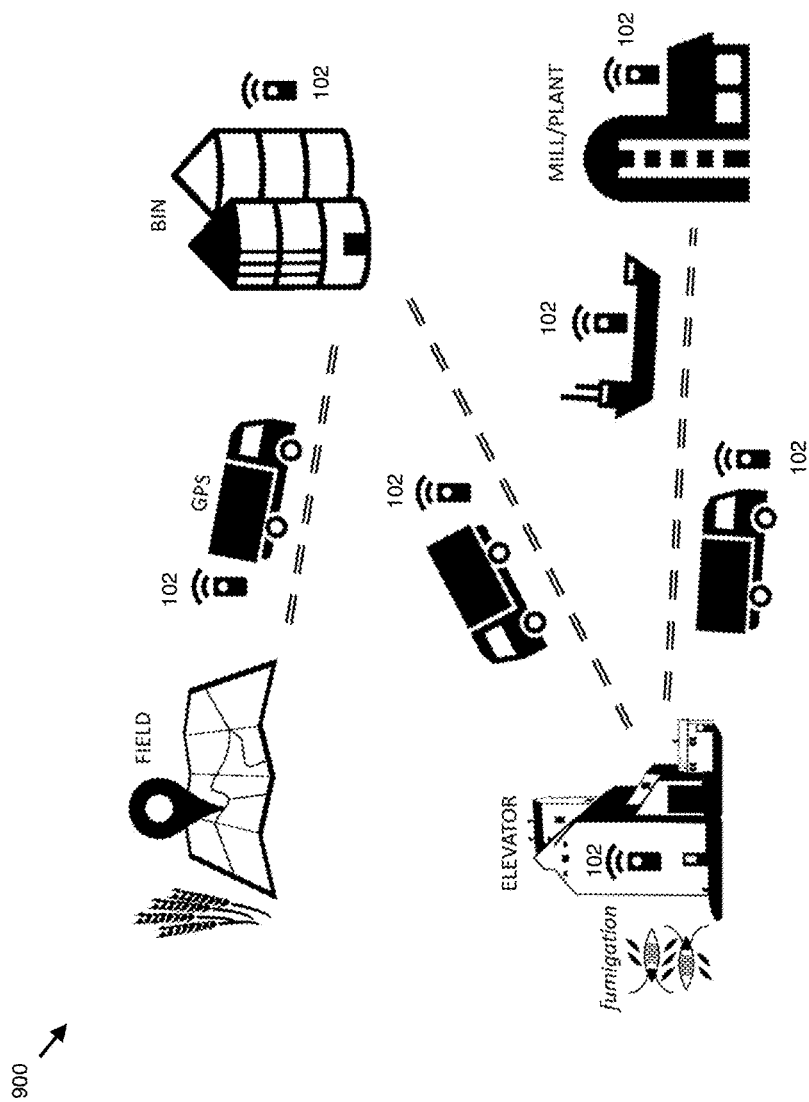
FIG. 9 illustrates an example of a bulk grain supply chain.

Traceability is the ability to trace and follow a food, feed, food-producing animal or substance intended to be, or expected to be incorporated into a food or feed, through all stages of production, processing and distribution [EUR-Lex, 2002], [Thakur, 2009]. In an exemplary bulk grain supply chain 900 shown in FIG. 9, the present invention can continually monitor grain characteristics and detect any changes that signal disruptions in its traced path. More specifically, for example:

a. A producer harvests product from the field and uses a portion of the harvest to create a model that identifies grain of a specific batch using the chamber described in Section 3.1. Field records may be attached to the model, relating it to pre-harvest data (such as data on seeds, fertilizers and insecticides that were employed). The batch is then shipped to a buyer. The buyer uses a device of this invention that correlates its output to the producer's trained model, stored in a cloud platform where it is secured against tampering, for verifying that the delivered batch is indeed the one sent by the producer.

b. A producer and buyer engage as in (a) above, but this time a device of this invention is also shipped immersed in the grain. In this manner, the batch is continually monitored for unauthorized alterations and may also be monitored for quality alterations induced by transportation conditions.

c. A producer and buyer engage as in (b) above, but this time the device also includes a GPS sensor. If the GPS data show a continuous traced path from producer to buyer along a route consistent with shipping manifests, that increases the confidence in the identity of the delivered goods.

In situations where the identity of the delivered product is protected through means additive to NIR spectra (such as GPS sensors and sealed boxes), and the buyer confirms that identity, the acquired NIR spectra (and environmental parameters) can be used to iteratively improve the model as described in Section 3.

Traceability information captured as described in this invention, augmented by other relevant data as mentioned above (e.g. field records, geolocation) can be published on a distributed ledger using blockchain techniques, to leverage the added features of transparency and immutability of records.

REFERENCES a. Al-Mahasneh et al., 2001: Al-Mahasneh, M. A., S. J. Birrell, C. J. Bern and K. Adham, Measurement of corn mechanical damage using dielectric properties, Transactions of ASAE, 2001 Annual International meeting, paper No.: 10-1073 (2001).

b. ASAE D245.6 October 2007 W/Corr. 1 (R2012) Moisture Relationships of Plant-based Agricultural Products.

c. Bantas et al., 2018: Bantas, S., Sotiroudas, V., Ham, R. E., Wireless sensor devices for post-harvest crop quality and pest management, United States Patent Application Publication 2018/0321185.

d. Bhargava, 2014: Bhargava N., Jain R., Joshi, I., Sharma, K. S., Investigation of Dielectric Properties of Some Varieties of Wheat and their Correlation with Food Nutrients, International Journal of Engineering Science and Innovative Technology (IJESIT), Volume 3, Issue 2 (2014).

e. Clemen, 1989: Clemen, R. T. "Combining forecasts: A review of annotated bibliography," International Journal of Forecasting, 5, 559-583 (1989).

f. EUR-Lex: Regulation (EC) No 178/2002 of the European Parliament and of the Council of 28 Jan. 2002 laying down the general principles and requirements of food law, establishing the European Food Safety Authority and laying down procedures in matters of food safety.

g. Levasseur-Garcia, 2018: Levasseur-Garcia C., Updated Overview of Infrared Spectroscopy Methods for Detecting Mycotoxins on Cereals (Corn, Wheat, and Barley), Toxins 10(1):38 (2018).

h. Manley, 2018: Manley M., Baeten V., Spectroscopic Technique: Near Infrared (NIR) Spectroscopy, Modern Techniques for Food Authentication (Second Edition), Chapter 3 (2018).

i. Nelson, 2015: Nelson, S. O., "Dielectric Properties of Agricultural Materials and their Applications," in Grain and Seed Moisture Sensing Applications, Chapter 7 (2015).

j. Nicolai et al., 2007: Nicolai, B. M, Beullens, K., Bobelyn, E., Peirs, A., Saeys, W., Theron, K. I., & Lammertyn, J., Nondestructive measurement of fruit and vegetable quality by means of NIR spectroscopy: A review, Postharvest Biology and Technology, 46, 99-118 (2007).

k. Osborne, 2006: Osborne, B. G., Near-Infrared Spectroscopy in Food Analysis, in Encyclopedia of Analytical Chemistry (R. A. Meyers and R. J. McGorrin eds.) (2006).

l. Pojic, 2012: Pojic, M., Mastilovic, J., Majen, N., "The Application of Near Infrared Spectroscopy," in Wheat Quality Control, Infrared Spectroscopy—Life and Biomedical Sciences, (Prof. Theophanides Theophile ed.) (2012).

m. Ssrensen, 2016: Ssrensen, K. M., Khakimov, B., Engelsen, S. B., The use of rapid spectroscopic screening methods to detect adulteration of food raw materials and ingredients, Curr. Opin. Food Sci. 10, 45-51 (2016).

n. Thakur et al., 2009: Thakur M., Hurburgh C. R., Framework for implementing traceability system in the bulk grain supply chain, Journal of Food Engineering, v. 95, i. 4, pp. 617-626 (2009).

What is claimed is:

1. A method for classifying properties of a commodity, without need for manual preparation of a sample of the commodity, the method comprising:

situating one or more devices at a position within a commodity, wherein the devices comprise at least one spectrometer, and, optionally, one or more sensors for determining one or more environmental parameters, the spectrometer being submerged, fully or partially, in the commodity so that a window of the spectrometer is covered by the commodity;

obtaining, via wireless data transmissions, one or more near-field infrared spectra of a portion of the commodity surrounding the position by the spectrometer, geographic position information concerning the location of the commodity, and, optionally, environmental sensor data from the one or more sensors;

preprocessing the obtained spectra to remove intensity variation due to irrelevant factors; and computing a prediction regarding the properties of the commodity using a model correlating infrared spectra and commodity properties, wherein the prediction is based on one or more obtained spectra, and, optionally, the environmental sensor data from the one or more sensors.

2. The method of claim 1, wherein the prediction is based on the one or more obtained spectra and the environmental sensor data from the one or more sensors, and the environmental sensor data includes measurements selected from the list consisting of: relative humidity, temperature, grain dielectric properties, concentrations of certain gasses present in the environment in which the commodity is located, commodity acidity, and alkalinity.

3. The method of claim 1, wherein the prediction concerns one or more of: surface mold, mycotoxins, adulteration of the commodity sample, authenticity of the commodity, or grading of the commodity.

4. The method of claim 1, where the commodity is being classified using any of principal component analysis, hierarchical cluster analysis, k-nearest neighbors, artificial neural networks, or support vector machines methods.

5. The method of claim 1, where the commodity is being analyzed for its chemical composition using any of multiple linear regression, principal component regression, partial least squares regression, or neural networks methods.

* * * * *